Jan. 12, 1954      H. CHANOWITZ      2,666,120
WELDING METHOD AND ARTICLE PRODUCED THEREBY
Original Filed March 5, 1945      3 Sheets-Sheet 1
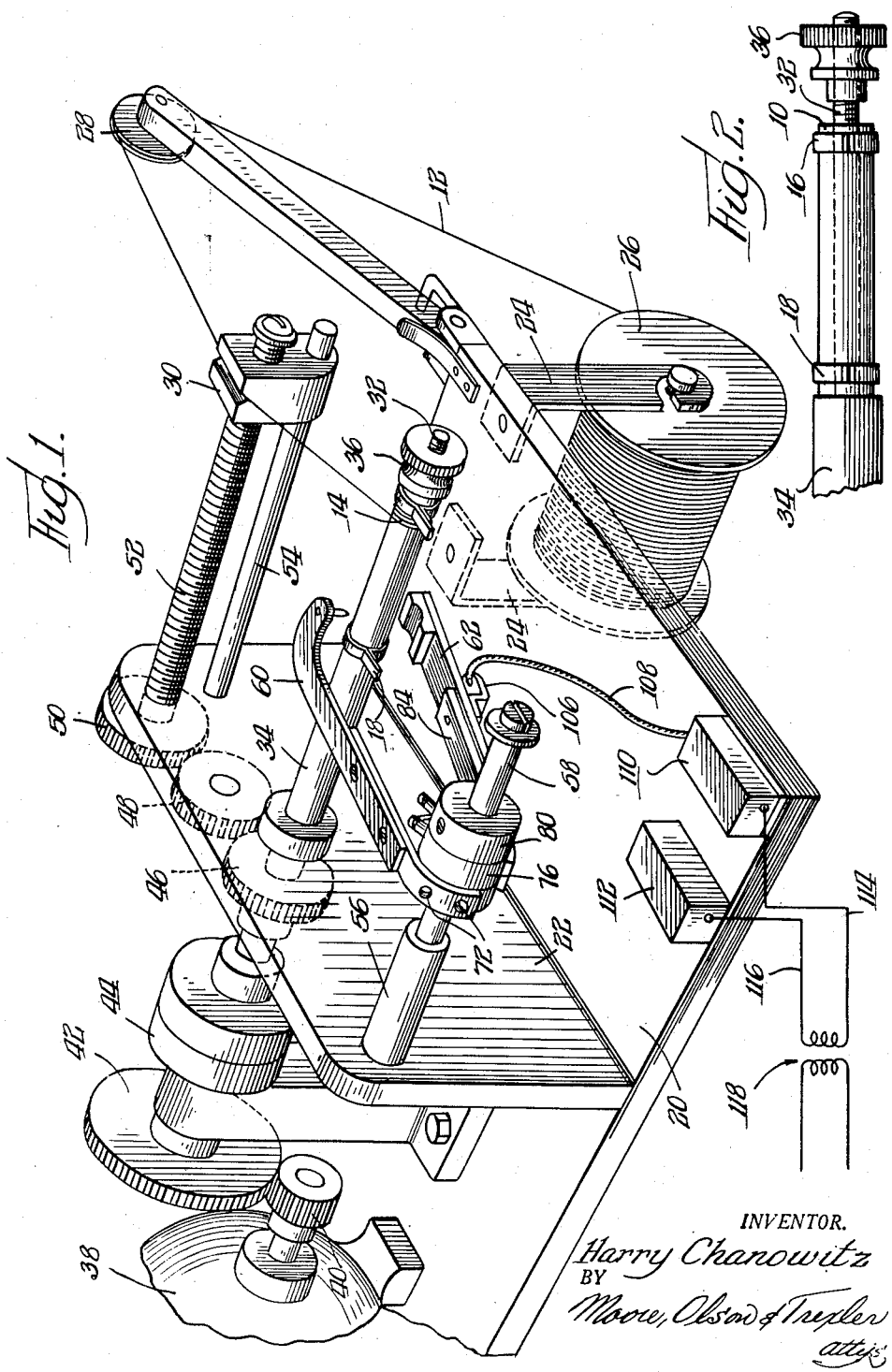
INVENTOR.
Harry Chanowitz
BY
Moore, Olson & Trexler
attys

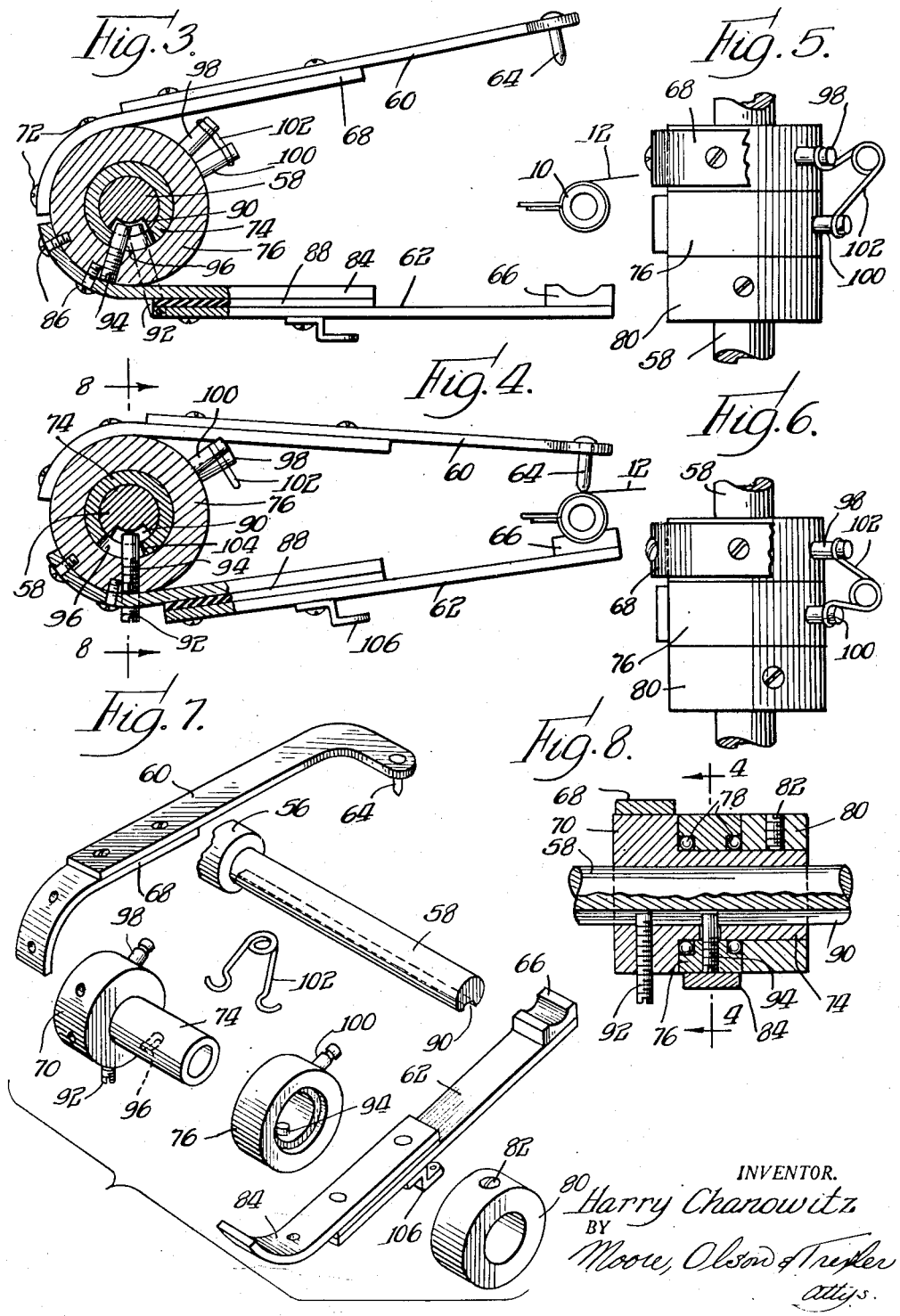

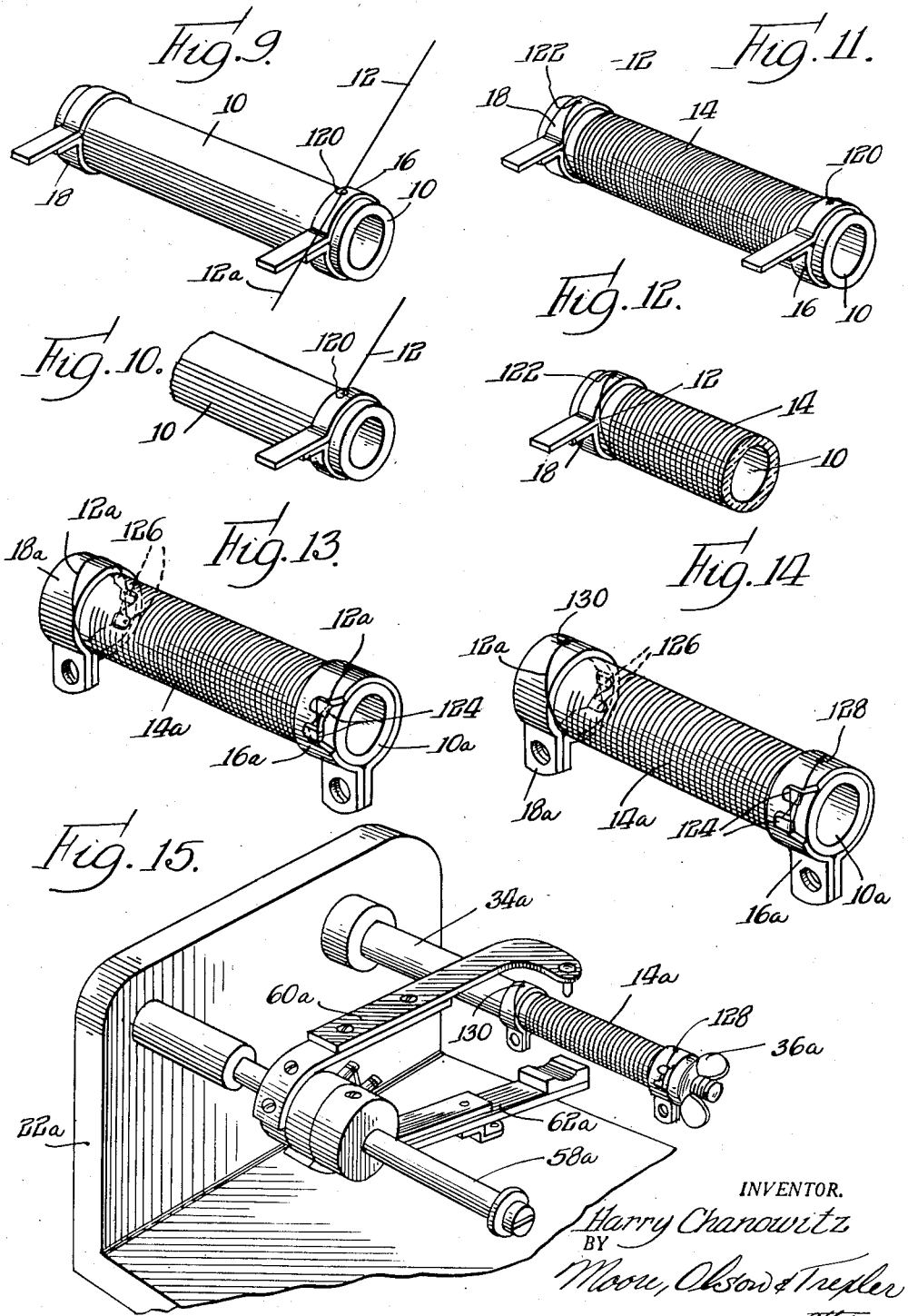

Patented Jan. 12, 1954

2,666,120

UNITED STATES PATENT OFFICE 2,666,120

WELDING METHOD AND ARTICLE PRODUCED THEREBY

Harry Chanowitz, Chicago, Ill., assignor to David T. Siegel, Wheaton, Ill.

Original application March 5, 1945, Serial No. 581,088, now Patent No. 2,460,807, dated February 8, 1949. Divided and this application November 5, 1947, Serial No. 784,132

8 Claims. (Cl. 201—63)

This invention relates to the art of welding, and concerns particularly the welding of wires and their associated connections in electrical units or devices such for example as fixed or variable resistors, coils and the like.

It is an object of the invention to provide improved methods and apparatus for effecting welding operations, and particularly operations such as the welding of resistance wires and the like to their associated terminals and contacts, in electrical appliances and devices.

More specifically stated it is an object of the invention to provide improved welding methods and apparatus, of the type set forth, wherein relatively fine and fragile wires, or like articles to be welded, may be secured and welded in position, readily and effectively, and without flashing of the weld or burning of the work pieces.

A further object of the invention is to provide improved welding methods and means of the type defined, wherein the welding operations may be effected, if desired, as an incident to the winding of the coils, whereby to facilitate the handling of the work pieces, minimize the operations required, and provide effective and automatically operable means for testing the strength and quality of the welded joint.

A still further object of the invention is to provide improved means and methods for securing resistance wires or the like to their associated fittings and contacts, in the manufacture of resistors, coils and the like; and to provide an improved resistor or coil structure.

Various other objects, advantages and features of the invention will be apparent from the following specification, when taken in connection with the accompanying drawings wherein certain preferred embodiments are set forth for purposes of illustration.

In the drawings, wherein like reference numerals refer to like parts throughout:

Fig. 1 is a general assembly view, in perspective, of an apparatus constructed in accordance with one embodiment of the invention, and incorporating the principles thereof;

Fig. 2 is a partial detail view of the mandrel support for the work piece to be welded, an electrical resistance unit in the particular embodiment disclosed;

Fig. 3 is a detail view of the electrode supporting arms of the work piece clamping unit, the arms being shown in open or disengaged position;

Fig. 4 is a view similar to Fig. 3, but showing the arms in their work piece clamping or engaged position, and taken as indicated by the line 4—4 of Fig. 8;

Figs. 5 and 6 are partial top views of the clamping unit, illustrating the position of the parts as in Figs. 3 and 4, respectively;

Fig. 7 is an exploded perspective view of the clamping unit, and associated parts;

Fig. 8 is a vertical sectional view of the clamping unit and its support shaft, taken as indicated by the line 8—8 of Fig. 4;

Figs. 9 to 12 are detail illustrative views showing the work piece in various stages of the working operations;

Figs. 13 and 14 are similar illustrative views, showing the manner of welding the work piece, by means of operations conducted subsequent to and apart from the winding of the resistance wire; and Fig. 15 is a partial perspective view of an apparatus such for example as used in effecting the work piece welding, as shown in Figs. 13 and 14.

This application is a division of my copending application, Serial No. 581,088, filed March 5, 1945, entitled "Welding Apparatus," now issued as Patent No. 2,460,807, dated February 8, 1949. The claims of the present application are directed to the method of the present invention, and to the article produced thereby.

Customarily it is the practice, in the manufacture of electrical resistance or coil units, to secure the electrical wire to its associated end terminals or contacts by mechanical tying and brazing or soldering operations. Particularly in instances wherein the wire is of relatively small size or gauge, difficulties are presented in the handling of the wire. Also the winding and securing operations, conducted separately, present further handling difficulties; and the soldering may be of such low temperature character as to become loose in service, or of such high temperature character as to render the wire brittle and thus liable to breakage.

In accordance with the present invention methods and apparatus are provided whereby the electrical wire of the coil or unit may be readily and effectively welded to the associated terminals or contacts of the coil or unit. Preferably, and in accordance with a preferred embodiment hereinafter to be specifically set forth, the welding operations may be effected as an incident to the winding of the coil, facilitating the handling of the wire, minimizing the number of operations required, and providing a uniform and self-testing welded connection. In accordance with the invention wires of relatively small size or gauge may be thus effectively handled and welded, without burning or flashing of the work piece.

The invention has been specifically illustrated as applied to the end welding of wires to their associated terminals and contacts, in the manufacture of electrical resistance units, or coils; as the invention in certain of its aspects is particularly adapted for such use. It is to be understood however that various aspects of the invention may also be used in connection with other types of welding operations, such for example as those wherein similar problems of size, handling, et cetera, may be presented.

Referring more specifically to the drawings, and first to the embodiment illustrated in Figs. 1 to 12 inclusive, in Fig. 1 there is shown a combined winding and welding apparatus for winding and welding the coil wire of a fixed value electrical resistor unit of known general type and construction. As best shown in Figs. 9–12 such resistor units conventionally comprise a cylindrical core or tube 10 of ceramic material, about which is wound a resistance wire, as indicated at 12, to form a coil 14. The ends of the core are provided with lugs 16 and 18 forming the contact terminals for the unit, and to which the ends of the resistance wire 12 must be electrically secured. Each lug comprises a band portion embracing the core and a pair of complementary angularly projecting tab portions in flatwise engagement. After the coil 14 has been formed, and the ends of the wire secured to the lugs 16 and 18, the outer surface of the unit may be covered with a suitable coating material (not shown) and baked on, frequently involving high temperature treatment.

Referring to Fig. 1, the apparatus shown comprises a main frame formed of a base plate 20 and a wall member 22 forming a support structure for the various operating elements of the machine. Vertically depending from the base plate 20 is a pair of brackets 24 forming a support for a supply spool 26 of the resistance wire. From the supply spool the wire is led over an idler guide pulley 28 and then over a shiftable guiding block 30, the function of which is to guide the wire onto the resistance unit core, whereby to form the coil 14.

As best shown in Figs. 1 and 2, the core 10 of the resistor may, for example, be mounted upon the reduced end portion 32 of a mandrel 34 rotatably mounted in the vertical support wall 22. The reduced mandrel end portion is threaded and receives a lock nut 36 which, after the core 10 has been slipped onto the end of the mandrel, may be clamped into engagement with the core, locking it to the mandrel for rotation therewith.

The mandrel is adapted to be driven by an electric motor 38 through suitable gearing and clutch connections. As shown, the end of the motor shaft is provided with a pinion 40 arranged to drive a gear 42 which through the intermediary of a clutch, as indicated at 44, rotatably drives the mandrel shaft, when the motor is in operation and the clutch engaged.

Fixed to the mandrel shaft for rotation therewith is a gear 46 which through a meshing idler gear 48 drives a gear 50 secured to the end of an elongated threaded shaft 52 with which the guide block 30 is arranged to have threaded engagement. It will be seen that as the shaft 52 is rotated with the mandrel shaft 34, the guide block 30 will be longitudinally translated at a predetermined rate of travel, whereby to determine the pitch of the wire coil 14, as it is formed on the resistor core 10. To guide the block 30, and preclude the block from rotation, its lower portion is provided with an opening loosely receiving a guide shaft 54 projecting from the support wall 22, and supported thereby, as shown.

A stationary support axle 56 is supported by and projects from the wall 22, the reduced end portion 58 of this axle forming a tool support for the electrode carrying arms of the work piece welding and clamping unit. As best shown in Figs. 1 and 3–8, the welding unit comprises upper and lower support arms 60 and 62 carrying, respectively, the upper and lower electrode members 64 and 66 which are adapted for engagement with the work piece to effect the welding operation. As shown, in the particular structural embodiment illustrated, the upper electrode member 64 is in the form of a pin adapted to have substantially point contact with the work piece, whereas the lower electrode 66 is provided with a grooved or trough surface adapted to engage the work piece over a relatively larger area.

As perhaps best shown in Fig. 7, the upper electrode support arm 60 is secured to a bracket 68 which is in turn adapted to be secured to a collar 70, by suitable means such as screws or the like 72, Fig. 3. The collar 70 is mounted on the reduced axle portion 58, for slidable movement therealong and limited rotational movement in respect thereto, as will presently be described. The collar 70 has an integral sleeve extension 74 on which is mounted a collar 76, for limited rotational movement in respect to the sleeve. To facilitate the relative rotational movements of the sleeve 74 and collar 76, anti-friction bearings 78 are preferably arranged therebetween, as best shown in Fig. 8. The collar 76 is retained from axial displacement by means of a holding collar 80 adapted to be fixed on the end of the sleeve 74, by a suitable means such as set screw 82. The lower electrode support arm 62 is fixed to the collar 76 by means of a bracket member 84 and screws 86, suitable insulation as indicated at 88 being interposed between the bracket and the arm so as to electrically insulate the latter.

As previously indicated, means is provided for mounting the arms 60 and 62 for limited rotational movements relative to each other, so as to engage and disengage the work piece, and also for free sliding movement axially of the support axle, so that the electrodes may be properly longitudinally positioned for work piece engagement and operation. More specifically, the reduced axle end portion 58 is provided with a longitudinally extending slot or key-way 90 into which loosely projects a threaded stud 92 carried by the collar 70. Similarly the collar 76 is provided with a stud or pin 94 loosely projecting into the key-way 90 and also through a slot 96 formed arcuately for a predetermined distance in the sleeve 74.

The collar 70 also carries a pin 98 and the collar 76 carries a pin 100 between which is suspended compression spring 102. As the electrode support arms are moved between open and closed positions, as respectively shown for example in Figs. 5 and 6, the pins 98 and 100 are moved past each other, their positions being relatively reversed in a circumferential direction. The spring tends to separate the pins circumferentially, and thus tends to urge the electrode arms apart when they are in open position, as shown in Figs. 3 and 5, or together when they are in closed position, as shown in Figs. 4 and 6, in the nature of a toggle.

Referring to the open or disengaged position of the electrode support arms, as shown in Fig. 3, it will be seen that when the parts are in this position, the pin 94 carried by the collar 76 engages one end of the slot 96 in the sleeve 74, thus limiting the separation of the electrode support arms under the urging action of the spring 102. The pin 94 is displaced slightly from one side of the axle key-way 90, whereas the pin 92 is displaced slightly from the other side of the axle key-way. By this means it will be seen that there is no binding action between the pins and the axle, so that the entire clamping unit may be freely moved longitudinally of the axle into proper position. At the same time one or the other of the pins will engage the sides of the key-way if attempt is made to rotate the clamping structure as a unit materially from the position shown in Fig. 3, the electrode support arms thus being held in position as shown, for ready work piece engagement, but for free movement longitudinally of the axle.

When the support arms are moved into closed or work piece engaging position, as shown in Fig. 4, the pins 94 and 92 are moved substantially into axial alignment, both pins remaining projected into the axle key-way 90, but there being sufficient clearance between the pins and the key-way side walls so as to permit the electrodes to adapt themselves to the precise positioning of the work piece, and clampingly engage the work piece under the urging action of the spring 102. In the event that the electrode arms should be inadvertently moved into clamping engagement, if no work piece is in position to be engaged, the pin 94 will engage the end wall 104 of the slot 96 slightly before the electrode members come into contact. By this means the electrodes are protected, in the event the support arms should be snapped toward each other, inadvertently and with undue force, as when a work piece is not in position.

For the purpose of supplying suitable welding current to the electrodes, and as shown in Fig. 1, the lower electrode arm 62 is provided with a bracket 106 connected by means of a flexible cable or wire 108 with a terminal block 110 supported upon and suitably insulated from base plate 20. A second terminal block 112 is mounted upon and electrically grounded to the base plate, for supplying current through the frame to the frame grounded electrode support arm 60. Current is supplied to the terminal blocks 110 and 112 from wires 114 and 116 connected with a suitable welding transformer and control apparatus, as diagrammatically indicated at 118. The apparatus 118 may, for example, comprise a synchronous half cycle electronic welder, for supplying an accurately controlled welding current, of short duration, to the welding electrodes. Various suitable forms of control apparatus 118 may be employed, and the details thereof form no part of the present invention, except in so far as they enter into combination with the other elements set forth.

In the operation of the combined winding and welding apparatus, the operator first fixes the work piece core member 10 with its attached terminal lugs 16 and 18 onto the stationary mandrel 34 by means of the thumb screw 36, as previously described. The resistance wire 12 is then drawn across the band portion of the terminal lug 16, as shown in Fig. 9, and the electrode support arms 60 and 62 applied to the work piece so as to cause the pin electrode 64 to engage the wire, at its point of contact with the band 16, and the trough or support electrode 66 to engage the lower portion of the band, as shown in Fig. 4. It will be noted that the outer end of the upper electrode arm 60 is curved to facilitate the placement of the pin electrode 64 accurately into contact with the wire. Upon the application of the welding current, a weld as indicated at 120, Fig. 9, will be formed between the wire 12 and band 16, forming a secure mechanical and electrical connection between the parts. The end 12a of the wire may then be broken off, as indicated in Fig. 10, this operation serving also as a testing means for the quality of the weld, as the weld must be properly formed to permit the pulling and breaking off of the wire end. Additional testing means for the weld may of course be provided if desired.

The welding arms 60 and 62 are then disengaged from the work piece and rotation of the mandrel 34 initiated, and under guidance of the guide block 30, the resistance wire coil 14 will be formed upon the core 10. Upon stopping of the mandrel, and as indicated in Fig. 11, the wire 12 may then be drawn across the upper face of the band portion of the terminal 18 and the welding electrodes again applied whereby to form a second weld as indicated at 122 between the resistance wire and the terminal lug 18. Again the wire end is broken off, and the quality of the weld simultaneously tested, the completed work piece being indicated in Fig. 12.

It will thus be seen that combined welding and winding means is provided, whereby the wire 12 may be mechanically and electrically connected to the terminals 16 and 18, in an improved and readily operable manner, and also as an incident to the winding of the coil. The welded connection between the wire 12 and the terminal lugs 16 and 18 provides a mechanically strong and electrically effective connection, and a connection which will remain secure during high temperature operation or during firing or baking operations to which the unit may be subjected in connection with the enamel coating thereof. Breakage or deterioration of the resistance wire is precluded. The wire may be of fine gauge, such for example as may be broken by manual pulling when anchor welded as above described, and may be of extremely fine gauge such for example as .001 inch or less in diameter.

By effecting the welding in connection with the winding operations, handling of the wire, which as stated may be of relatively fine gauge, is facilitated and minimized. There are no small and loose wire ends to be handled, and the breaking off of the wire, as heretofore described, provides for the automatic testing of the quality of the weld, and the accuracy and positioning thereof.

Particular attention is directed to the manner in which the electrodes are maintained in contact with the work pieces, and particularly the manner of engagement between the pin electrode 64 and the wire. It will be seen that the support arms 60 and 62, and their associated parts, constitute an extremely low inertia electrode support structure, so that the spring 102 may without undue pressure maintain desired contact between the electrodes and the work pieces during the welding opeartion. As heretofore pointed out, the wire to be welded, such as the wire 12, may be relatively thick or it may be extremely fine, on the order of .001 inch in diameter or less. Problems are presented, particularly in the welding of such fine wire, in effecting the production of a satisfactory weld without the burning or flashing of the work piece. The apparatus provided in accordance with the present invention, and more particularly the action of the spring 102 taken with the light inertia electrode support structure, maintains a relatively light, but insured and uniform pressure engagement between the work piece and the electrodes during the entire welding operation. Undue mashing pressure or pressure which tends to reduce contact resistance below a desired value, is avoided, while at the same time the electrode 64 follows the movement or contour of the wire, as it is flattened and as it is welded, maintaining a uniform controlled pressure engagement. Coupled with short duration accurately controlled welding current, relatively fine wire, including copper alloy and other non-ferrous alloys, may be welded.

In certain instances it may be desirable to effect the winding of the coil, and thereafter the welding operations. Such an arrangement is illustrated in Figs. 13, 14 and 15. In Fig. 13 a work piece is illustrated, essentially similar to that previously described, except that the end contact lugs 16a and 18a, corresponding to the lugs 16 and 18 previously described, are in this instance provided with upstanding ears as indicated at 124 and 126. The coil 14a may be formed by means of a winding apparatus essentially similar to that illustrated in Fig. 1, but without welding, the ends of the wire 12a being wound around the ears 124 and 126, as shown. If desired, the ears may be pressed downwardly onto the wire to aid in holding it in position.

The work piece may then be mounted in a welding apparatus as shown in Fig. 15 and welded as indicated at 128 and 130 in Fig. 14. The apparatus of Fig. 15 is essentially similar to the welding structure of Fig. 1 except that the work piece mandrel as indicated at 24a is in this instance non-rotatable. It is believed that the operation of the structure is clear from what has heretofore been set forth.

It is obvious that various changes may be made in the specific embodiments set forth without departing from the spirit of the invention. The invention is accordingly not to be limited to the precise embodiments shown and described, but only as indicated in the following claims.

The invention is hereby claimed as follows:

1. A wire coil electrical resistor or the like comprising a core member, a pair of connector lugs mounted in predetermined fixed position upon the core member, each of said lugs comprising a band portion embracing the core member and an angular projecting tab portion, and an elongated electrical wire wrapped into a wire coil about the core member, the wire being on the order of .001 inch or less in diameter, and the ends of the wire being electro-resistance welded, respectively, to the band portions of said lugs and solely secured thereby to said lugs.

2. A wire coil electrical resistor or the like as defined in claim 1, wherein the welded ends of the wire are in alignment in a direction axially of the core member.

3. A wire coil electrical resistor or the like as defined in claim 1, wherein the ends of the wire are terminated, respectively, at the points of welded connection.

4. A wire coil electrical resistor or the like as defined in claim 1, wherein the wire is maintained in predetermined tension by and between the points of welded connection.

5. A wire coil electrical resistor or the like comprising a core member, a pair of connector lugs mounted in predetermined spaced relation upon the core member, each of said lugs comprising a band portion embracing the core member and a pair of complementary angularly projecting tab portions in flatwise abutment, and an elongated electrical wire wrapped into a wire coil about the core member between said lugs, the wire being of fine gauge and the ends of the wire being electro-resistance welded, respectively, to the band portions of said lugs and solely secured thereby to said lugs, the ends of the wire terminating, respectively, substantially at the points of welded connection, and the wire extending between said points helically across the faces of the lug band portions and around the core member and being maintained by the welded connections under predetermined tension.

6. The method of making a wire coil electrical resistor or the like which comprises the steps, in suitable order, of mounting a pair of connector lugs having band portions in predetermined spaced fixed position upon a core member with the band portions of the lugs embracing the core member, clamping an elongated fine gauge electrical wire adjacent one end thereof to the band portion of one of said connector lugs by an electrode and electro-resistance welding the wire thereto, severing the loose end of the wire by manually pulling to subject it to sufficient tension to break off said loose end and simultaneously test the quality of the weld, wrapping said wire into a wire coil upon the core member, clamping a portion of the wire adjacent the free end thereof by an electrode to the band portion of the other connector lug and electro-resistance welding the wire thereto, and subjecting the wire beyond the weld to sufficient tension by manual pulling to break off the extending wire end beyond the weld and simultaneously test the quality of said weld.

7. The method of making a wire coil electrical resistor or the like which comprises the steps, in suitable order, of mounting a pair of connector lugs of the type having band portions and angularly projecting tab portions upon a core member with the band portions of the lugs embracing the core member in predetermined fixed position thereon, clamping an elongated fine gauge electrical wire adjacent one end thereof against the band portion of one of the connector lugs by means of a low inertia electrode of lesser area, while engaging the lug at a point circumferentially spaced from the point of engagement of the first electrode by a complementary electrode of greater area, passing current between said electrodes and through the lug to effect the electro-resistance welding of the wire to the said band portion of the lug, wrapping the wire into a wire coil upon the core member, clamping a portion of the wire adjacent the free end thereof against the band portion of the other connector lug by means of a low inertia electrode of lesser area, while engaging the lug at a circumferentially spaced point by a complementary electrode of greater area, and passing current between said last named electrodes and through the lug to effect the electro-resistance welding of the wire to the band portion of said second lug and subjecting the ends of the wire beyond the welds to sufficient tension by pulling thereon to break off the ends of the wire extending beyond the welds and simultaneously test the quality of the welds.

8. The method of making a wire coil electrical resistor or the like, as defined in claim 7, wherein the wire is maintained under tension during at least one of said welding operations.

HARRY CHANOWITZ,

References Cited in the file of this patent

UNITED STATES PATENTS

| Number | Name | Date |
|---|---|---|
| 1,256,599 | Schoop | Feb. 19, 1918 |
| 1,541,513 | Knoop | June 9, 1925 |
| 1,563,812 | Waller | Dec. 1, 1925 |
| 1,806,188 | Adams | May 19, 1931 |
| 1,830,084 | Bjorndal | Nov. 3, 1931 |
| 1,971,809 | Bjorndal | Aug. 28, 1934 |
| 2,247,688 | Kinyon | July 1, 1941 |
| 2,253,375 | Henninger | Aug. 19, 1941 |
| 2,373,427 | Stickney | Apr. 10, 1945 |
| 2,402,122 | Bullinger | June 18, 1946 |
| 2,546,315 | Oakley | Mar. 27, 1951 |

FOREIGN PATENTS

| Number | Country | Date |
|---|---|---|
| 368,295 | Germany | Feb. 3, 1923 |